United States Patent
McKinnon, Jr.

[11] 4,263,053
[45] Apr. 21, 1981

[54] METHOD FOR CLEANING AND DRYING HOLLOW FIBERS

[76] Inventor: Charles N. McKinnon, Jr., 31975 Ave. Evita, San Juan Capistrano, Calif. 92675

[21] Appl. No.: 32,280

[22] Filed: Apr. 23, 1979

[51] Int. Cl.³ .............................................. B08B 9/00
[52] U.S. Cl. ...................................... 134/21; 134/23; 134/30; 134/33; 134/40; 134/25.4
[58] Field of Search ............... 134/21, 22 C, 23, 25 C, 134/33, 37, 40, 30; 34/8, 15, 21

[56] References Cited
U.S. PATENT DOCUMENTS

| | | | |
|---|---|---|---|
| 2,348,465 | 5/1944 | Geiringer | 34/21 X |
| 2,569,690 | 10/1951 | Ressinger | 134/33 X |
| 2,628,431 | 2/1953 | Chapman | 134/33 X |
| 2,897,601 | 8/1959 | Hulton et al. | 34/21 |
| 3,047,436 | 7/1962 | Zinty | 134/23 |
| 3,257,732 | 6/1966 | Webster | 34/8 |
| 3,893,843 | 7/1975 | Fry et al. | 134/33 X |
| 4,166,031 | 8/1979 | Hardy | 134/22 C X |

Primary Examiner—Marc L. Caroff

[57] ABSTRACT

The removal of manufacturing oils from a pre-potted, wound bundle of hollow fibers used in dialysis equipment, is rapidly accomplished by subjecting the fiber assembly to centrifugal forces acting longitudinally of the fibers. Wicking pads may be used at the outer ends of the fibers during the centrifuging step if desired to counteract the capillary action of the fibers. Following the centrifuging, the fibers are repeatedly immersed, in a vertical direction, in a solvent into which any oil trapped in the pores of the fiber walls diffuses. The repeated rise and fall of the solvent in the fiber lumen continually re-introduces fresh solvent into the lumen to leach oil out of the pores at a rapid rate.

In the same manner, moisture is then removed from the fibers by alternately evacuating the fiber lumens in a vacuum chamber and refilling them with warm, very dry air to rapidly remove any moisture contained in the cellulose of the fibers.

8 Claims, 5 Drawing Figures

METHOD FOR CLEANING AND DRYING HOLLOW FIBERS

BACKGROUND OF THE INVENTION

In the manufacture of blood dialysis cartridges or similar mass transfer equipment, it is necessary to remove from the semipermeable hollow fibers which carry the blood to be dialyzed, the organic oils introduced into the fibers during their manufacture as a perservative. Normallly, this is done by soaking the fibers or flushing them with an appropriate solvent at a convenient step in the cartridge assembly process. For reasons related to the nature of the material and to the dimensional parameters involved, eight to ten washes are normally required to bring the oil content of fibers down to clinically acceptable levels. This procedure is quite time-consuming and expensive. In addition, it is wasteful of solvent and, with certain solvents, tends to attack the glycerin in the fiber walls which give the fibers their essential permeability characteristics.

It has also been found that when fiber ends, in the course of manufacturing a cartridge, are potted in polyurethane to form a manifold, sealing problems between the polyurethane and the fiber walls arise more because of the moisture content of the highly hygroscopic cellulose fibers than because of oil residues on the fiber walls. Due to the heat sensitivity of the fibers used in blood dialyzers, process temperatures of 50° C. or above are not allowed. This rules out conventional oven-drying methods.

SUMMARY OF THE INVENTION

In accordance with the invention, the manufacturing oils are removed by a two-phase process consisting of a centrifugal extraction phase followed by a rinsing phase. In the first phase, a pre-potted fiber bundle is placed into a centrifuge whose axis of rotation is perpendicular to the axis of the fiber bundle and spaced from the fiber bundle to be treated. Both ends of each fiber are kept open; or, if desired, a blotting or wicking pad may be placed against the outer end of the cartridge. After only a few minutes in the centrifuge, most of the oil has been spun off, and the cartridge can be simply dipped a few times into a solvent bath to get rid of the last residues of oil.

The purpose of the repeated dipping is to maintain, in the lumen of the fibers, solvent with as low a concentration of oil as possible, so as to cause the oil trapped in the pores of the fiber walls to rapidly migrate into the solvent. This is accomplished by continually filling the fibers with solvent and then emptying them again.

The same concept is used in the drying operation. After the fibers have been sufficiently cleaned of oil, they are dried by alternately exposing them to a high vacuum and to dry, warm air. This process results in the fibers continually being emptied of air which has picked up moisture from the fibers and then refilled with drier air. After several cycles, the fibers are stored in a vacuum until they are potted in a warm, dry atmosphere.

DETAILED DESCRIPTION OF THE INVENTION

In the manufacture of blood dialysis equipment, large numbers of thin, hollow semipermeable fibers are typically assembled into bundles, both the bundles and their component fibers extending longitudinally of the dialysis cartridge in which they are eventually used. They are then mounted into the cartridge by a potting process which holds the ends of the fibers and provides manifolds through which the interior or lumen of the fibers is made accessible to the blood during dialysis.

In order to obtain a satisfactory seal between the fibers and the potting compound, manufacturing oils and moisture must be removed from the fibers as discussed in more detail below. For both purposes, free access of cleaning and drying fluids to the lumen of the fibers is essential, but the limp and delicate nature of the fibers makes this difficult in conventional processes.

The copending application of Robert C. Brumfield, Ser. No. 028,239, filed Apr. 9, 1979 and entitled "Mass Transfer Device and Method of Making the Same" discloses a manufacturing method in which the fibers are wound on a mandrel and then anchored to the mandrel by a preliminary potting operation which, together with the mandrel forms a rigid structure capable of holding the fibers in place and providing access to their lumens through a temporary manifold surface. The rigid structure provided by the preliminary potting of the aforesaid application not only allows convenient handling of the fiber bundle prior to final potting, i.e. during the cleaning and drying operation, but also allows the fiber bundles to withstand the rigors of centrifuging, so as to make practical the process of this invention as hereinafter described.

Figure 1:
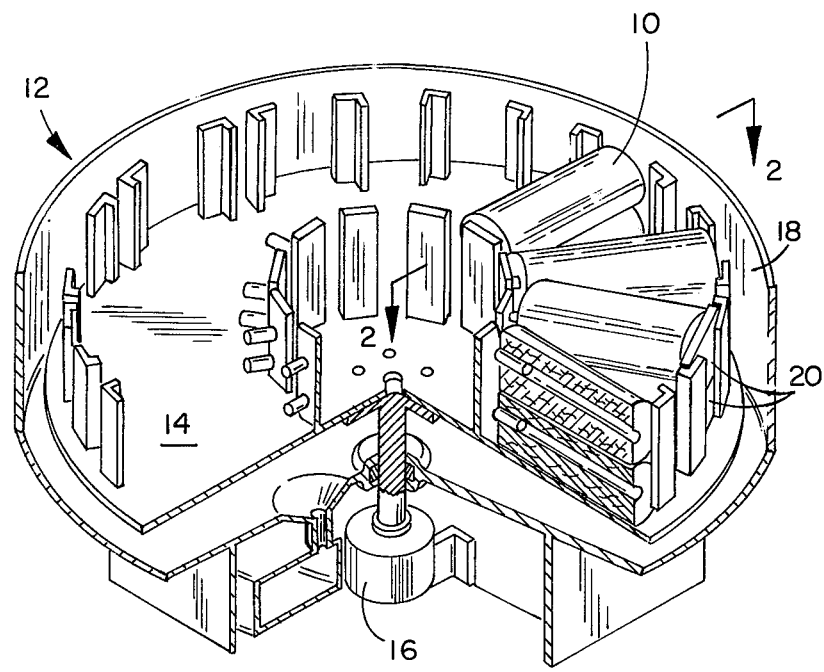
FIG. 1 is a schematic representation showing the centrifuge and the placement of the cartridge therein.

In the course of their manufacture, the walls of the hollow fibers are impregnated with glycerin, which is essential to the premeability characteristics which make these fibers useful for blood dialysis. The fibers are also manufactured with a filling of coconut oil which gives handling strength and prevents flattening of the round cross-section during subsequent operations, e.g. winding on spools. Prior to the final potting step, however, in which the fibers are sealed into a fluid-tight dialysis cartridge by means of a polyurethane compound, it is necessary to remove the coconut oil from both the inside and the outside of the fibers. This is necessary not only because it is undesirable to introduce any significant amount of coconut oil into the blood being dialyzed, but also because oil residues on the outside of the fibers tend to impair the ability of the final-potting compound to form a reliable fluid-tight bond with the fibers. Consequently, it is normally necessary in the manufacture of blood dialysis equipment to remove the coconut oil from the fibers without affecting the glycerine in the fiber walls. Doing this by conventional methods is a difficult and at best highly time-consuming process, which represents a major bottleneck in dialysis cartridge production. In accordance with this invention, the oil removal is accomplished much more rapidly than previously possible by first mounting the pre-potted fiber bundles 10 on a centrifuge 12 (FIG. 1). Prior to mounting the fiber bundles 10 on the centrifuge, it is preferable to either let them stand on end overnight (i.e. for a period of time on the order of 15 hours) to predrain by gravity, or to blow air through them for about half a minute at a pressure (in a typical blood dialysis application) not exceeding about 0.6 atmospheres.

Figure 2:
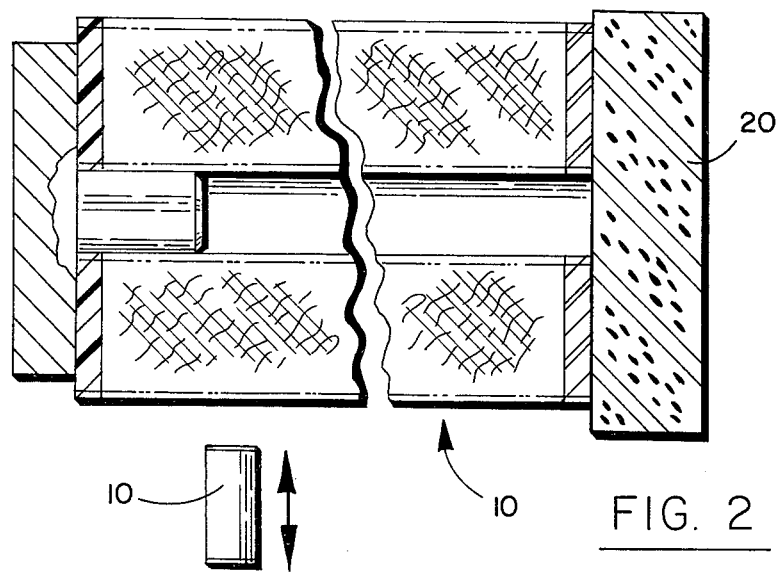
FIG. 2 is a vertical section of a cartridge on the centrifuge illustrating the use of a wicking pad.

In the preferred embodiment shown in the drawings, the centrifuge consists of a turntable 14 on the order of one meter in diameter. The turntable 14 is driven at approximately 150-250 rpm by a motor 16. The oil thrown from the outer ends of fiber bundles 10 is collected in a stationary collecting trough 18 for disposal. If desired, wicking pads 20 (shown in FIG. 2 and on some of the fiber bundles 10 in FIG. 1) may be used to overcome the capillary action of the fibers for more thorough oil removal, but in most cases, the use of wicking pads is unnecessary.

Figure 3:
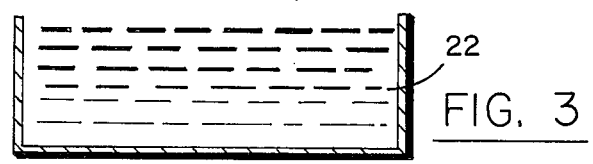
FIG. 3 is a schematic representation of the solvent bath for the dipping operation.
Figure 4:
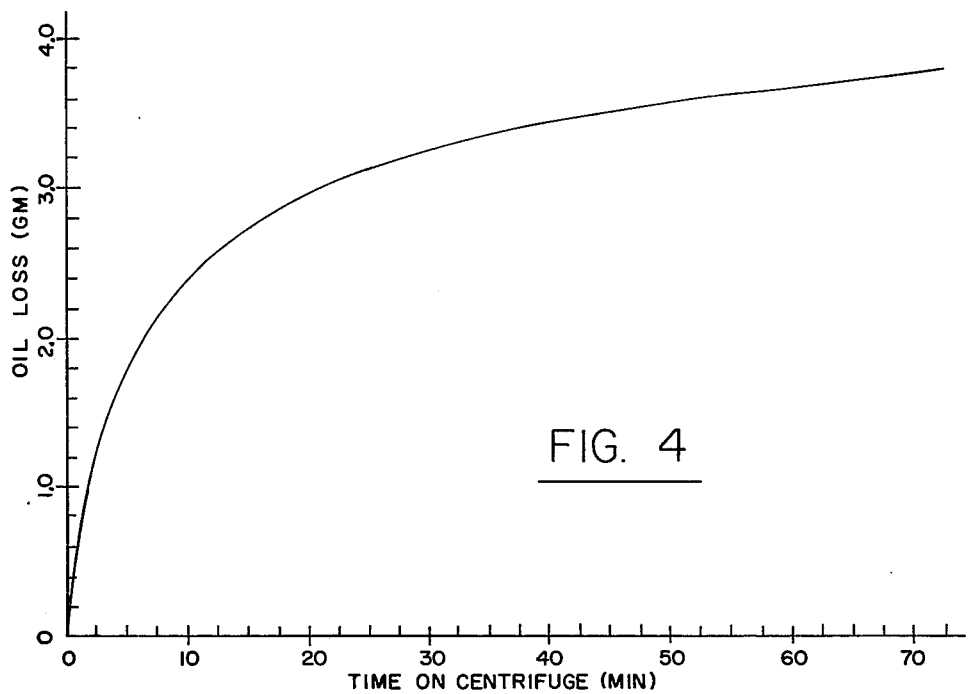
FIG. 4 is a diagram of time vs. oil content for the centrifuging step which illustrates the invention.

After a sufficient length of time on the centrifuge (about twenty to thirty minutes in a preferred embodiment of the invention), during which the oil is extracted from the fiber bundles generally in accordance with the graph of FIG. 4, the fiber bundles 10 are removed from the centrifuge 12 and are dipped with the longitudinal direction vertical into a bath 22 (FIG. 3) of dichlorodifluoroethane (such as, e.g. Allied Chemical Corporation's Freon TF) for about two minutes, then allowed to drain for about one minute. It should be understood that although this description refers to dipping the fiber bundles into a solvent bath, the immersion of the fibers can be accomplished equally well if the fiber bundles remain stationary and the liquid level of the solvent bath is raised and lowered. The object of either procedure is to repeatedly convect solvent over the lumen surface. All that is required is a relative motion of solvent and fiber bundle in a vertical direction.

The dipping procedure is preferably repeated about four times in the same bath, then four more times in each of two baths of dichlorodifluoroethane solution, and finally four more times in another bath of substantially clean dichlorodifluoroethane. The successive baths are preferably increasing solvent purity or, if economically practical, of clean solvent throughout. The rise and fall of the dichlorodifluoroethane level inside the fibers as they are immersed and withdrawn produces convection of oil-free solvent inside the fiber tube, enhancing the diffusion of oil out of the tube wall into the solvent.

In a typical use of the invention for blood dialysis equipment, the residual oil content of the fibers drops below the 10 ppm tolerance level (i.e. the level necessary to prevent oil condensation during sterilization) in the fourth bath, and the fiber bundles are then ready for drying and final potting.

By their very nature, the fibers used in blood dialyzers are highly hygroscopic. Their water content tends to equilibrate with the relative humidity of the ambient air in a matter of 5 to 10 minutes. Moisture in the fibers does, however, tend to produce microscopic bubbles during the final potting process. These bubbles tend to interfere, even more so than the manufacturing oils, with the fluid-tight bond between the polyurethane material used in final potting and the fiber surface. Consequently, in order to avoid leaks as much as possible, the fiber bundles must be dried before the final potting steps.

Figure 5:
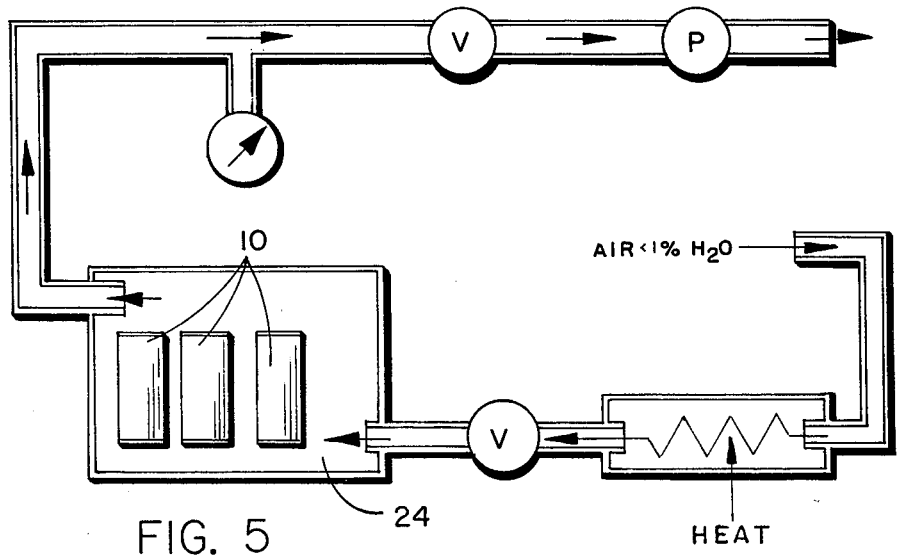
FIG. 5 is a schematic representation of the drying process.

In order to dry the fibers efficiently without damaging them by excessive heat, the fiber bundles 10 are placed in a vacuum chamber 24 (FIG. 5) which is then evacuated to remove any moist air trapped inside the hollow fibers. The chamber 24 is then filled to atmospheric pressure with dry (less than 1% relative humidity) air heated, in a heat exchanger 26 or other appropriate device, to a temperature such that, after being cooled by the adiabatic expansion upon entering the vacuum chamber, its final expanded temperature will be below 50° C.

The process described above is preferably repeated several times. Just as in the case of oil diffusion into the solvent during the oil removal operation, the moisture absorption from the fiber walls by the dry air follows an asymptotic curve so that the moisture-removing effectiveness of the dry air rapidly diminishes after a few minutes. For this reason, the vacuum chamber is repeatedly evacuated and refilled with fresh dry air, care being taken during early evacuation cycles to avoid drawing enough of a vacuum to freeze the moisture then still present. As the moisture content of the fiber drops, greater vacuums can be pulled, eventually going down to approximately $10^{-2}$ Torr.

The inventive concept is thus based on the repeated use of the most effective portion of the fast time constant (5-7 minutes) for the equilibration of the moisture content of the fibers with that of the surrounding air. Again, the pump-down allows removal of moist air from the fiber lumen, and its replacement, on repressurizing to atmospheric pressure, with dry, warm air capable of absorbing more moisture from the fibers.

Following the drying process, the dried fiber bundles are best stored in a vacuum until they are ready for final potting in a hot, dry room.

What is claimed is:

1. A method of removing inherent oil from bundles of capillary hollow blood dialyzer fibers, comprising the steps of:
   (a) allowing said fiber bundles to predrain by gravity for a period of time on the order of 15 hours, and
   (b) then applying a centrifugal force to said fibers longitudinally thereof to drive said oil out of the interior of said fibers.

2. A method of removing inherent oil from bundles of capillary hollow blood dialyzer fibers, comprising the steps of:
   (a) forcing air under pressure through said fibers, and
   (b) then applying a centrifugal force to said fibers longitudinally thereof to drive said oil out of the interior of said fibers.

3. A method of removing inherent oil from bundles of capillary hollow blood dialyzer fibers, comprising the steps of:
   (a) applying a centrifugal force to said fibers longitudinally thereof to drive said oil out of the interior of said fibers; and
   (b) longitudinally immersing said fiber bundles in a vertical direction in at least one bath of dichlorodifluoroethane.

4. The method of claim 3, in which said immersion step in each of said baths includes repeated cycles of immersing and withdrawing said fiber bundles.

5. The method of removing manufacturing oils and moisture from pre-potted bundles of hollow semipermeable capillary fibers in the manufacture of blood dialysis cartridges, comprising the steps of successively
   (a) subjecting said fiber bundles to centrifugal forces in a direction generally longitudinal of said fibers;
   (b) repeatedly immersing said fiber bundles in, and withdrawing them from, a solvent which dissolves said manufacturing oils but does not dissolve glycerin; and (c) drying said fiber bundles by alternately exposing them to a vacuum and to warm dry air.

6. The method of claim 5, in which said solvent is dichlorodifluoroethane.

7. The method of claim 5 in which said warm dry air is air at atmospheric pressure having a temperature below 50° C. and a relative humidity of less than 1%.

8. The method of claim 5, in which said solvent immersion step includes the steps of repeatedly immersing said fiber bundles in a vertical direction in each of a plurality of baths of solvent of increasing purity.

* * * * *

UNITED STATES PATENT OFFICE
CERTIFICATE OF CORRECTION

Patent No. 4,263,053          Dated April 21, 1981

Inventor(s) Charles N. McKinnon, Jr.

It is certified that error appears in the above-identified patent and that said Letters Patent are hereby corrected as shown below:

Column 1, line 17 - after "of" insert --the--.

" 2, " 44 - "premeability" should read --permeability--.

Signed and Sealed this

Thirtieth Day of June 1981

[SEAL]

Attest:

RENE D. TEGTMEYER

Attesting Officer     Acting Commissioner of Patents and Trademarks